Figure 1:
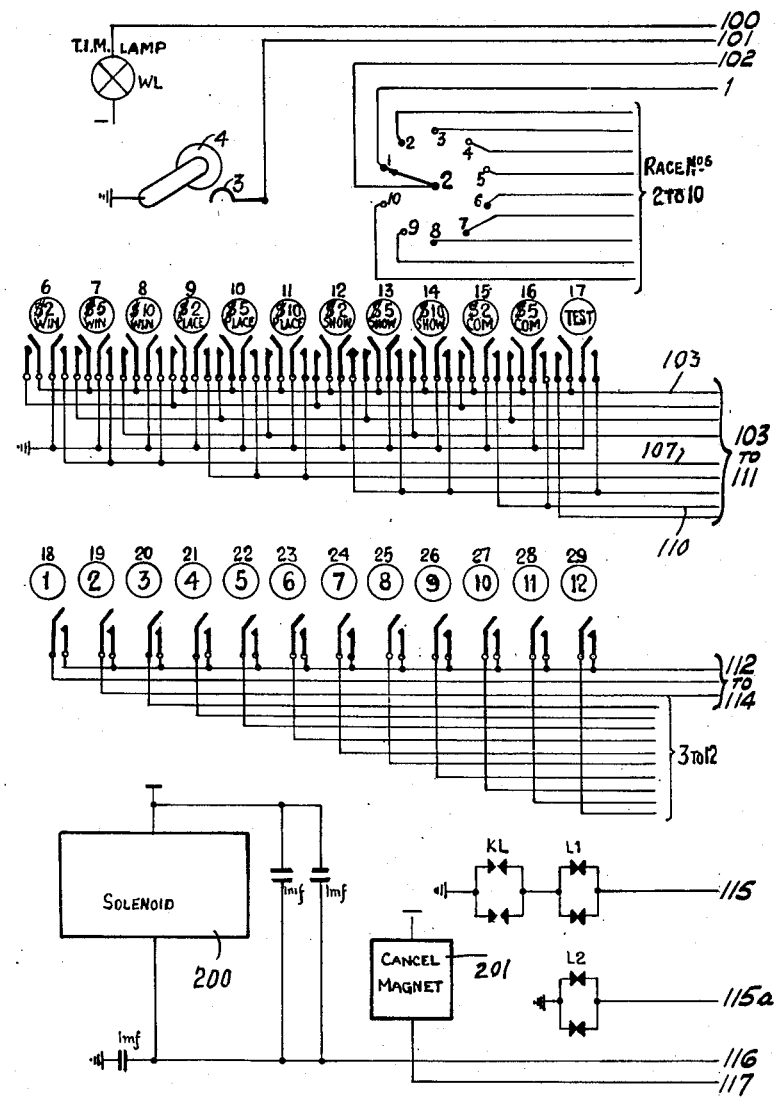

June 8, 1954   J. HANDLEY   2,680,561
TOTALIZATOR SYSTEM
Filed Jan. 28, 1950   4 Sheets-Sheet 2

June 8, 1954  J. HANDLEY  2,680,561
TOTALIZATOR SYSTEM
Filed Jan. 28, 1950  4 Sheets-Sheet 4

Patented June 8, 1954

2,680,561

UNITED STATES PATENT OFFICE 2,680,561

TOTALIZATOR SYSTEM

John Handley, Purley, England, assignor to The Union Totalisator Company Limited, Glasgow, Scotland, a corporation of Great Britain and Northern Ireland Application January 28, 1950, Serial No. 140,995

Claims priority, application Great Britain October 6, 1949

14 Claims. (Cl. 235—92)

The invention relates to improvements in totalisator systems and is particularly applicable to systems wherein ticket issuing machines are adapted to print and issue tickets of various values and on various pools. The invention has for its object to provide improved means for registering and issuing tickets on bets, improved means for handling combined bets, improved means for minimising faults and improved means for indicating faults.

A feature of the invention comprises a totalisator in which bets of various values on all competitors may be registered from any one of a number of ticket issuing machines, wherein means are provided comprising a stake relay and a competitor relay arranged to operate in response to the operation of a stake key and a competitor key on the ticket issuing machine to select and operate in series, over a collecting switch or commutator, the selected one of several registering relays on the total adding machine, a selected one of several registering relays on the selected competitor adding machine and a release relay associated with the ticket issuing machine to ensure that the machine cannot release unless the total and competitor relays on the adding machines have both received an operating potential.

A further feature of the invention comprises electrical totalisator equipment comprising ticket issuing machines and central totalising equipment, keys for different competitors and for different stake values on each ticket issuing machine, electrically operable ticket issuing mechanism in each ticket issuing machine, a pool total adding machine in the central equipment, a plurality of registering relays associated with said total adding machine, a group of competitor adding machines in said central equipment, a plurality of competitor registering relays associated with each competitor adding machine, electrical stake selecting equipment which forms part of the central equipment, electrical competitor selecting equipment which forms part of the central equipment, a ticket release relay individual to each ticket issuing machine for operating said electrically operable ticket issuing mechanism, a commutator in the central equipment arranged to select an operated ticket issuing machine for registration purposes, and a series of adding machine operating circuits each comprising a single total registering relay, a single competitor registering relay, commutator contacts, contacts controlled by said stake-recording equipment, contacts controlled by said competitor recording equipment, and a release relay, whereby a selected competitor adding machine, a pool total adding machine and the release relay are simultaneously operable.

Another feature of the invention comprises an electric totalisator system having a ticket issuing machine comprising at least one combined pool key and competitor keys, central totalisator equipment comprising total adding equipment and competitor adding equipment for each pool, means for automatically selecting and operating adding equipment of a particular pool, means associated with the adding equipment of each pool for checking the registration of bets in that pool, fault detection means under control of said bet registration checking means and arranged to operate if said checking means detects an incorrectly registered bet, means for indicating the particulars of an incorrectly registered bet under control of said fault detection means, means under control of said fault detection means for rendering the adding equipment of a pool inoperative when a fault is detected, automatic sequence control equipment for causing the individual bets of a combined bet to be automatically registered in turn on the adding equipment of the different pools independently of the operation of fault detection means in any pool, electrically operable ticket issuing mechanism in each ticket issuing machine operable to issue a ticket for a bet independently of said fault detection means.

A still further feature of the invention comprises a totalisator-adding equipment, means for temporarily indicating the stake for a bet, means for temporarily indicating the competitor for a bet, means for detecting a fault in the adding equipment, means for temporarily busying the equipment when a fault is detected, means for indicating a fault, and means for holding the stake and competitor indication when a fault is detected.

The invention will now be described with reference to one embodiment shown in the accompanying drawings.

The totalisator installation for a race track, for instance, comprises a central totalisator equipment with associated public indicators and a number of betting booths at suitable positions, each booth housing a ticket-issuing machine and its individual electrical equipment which may be built into the machine or mounted adjacent thereto. Electric cabling interconnects the central equipment with each booth.

Figure 2:
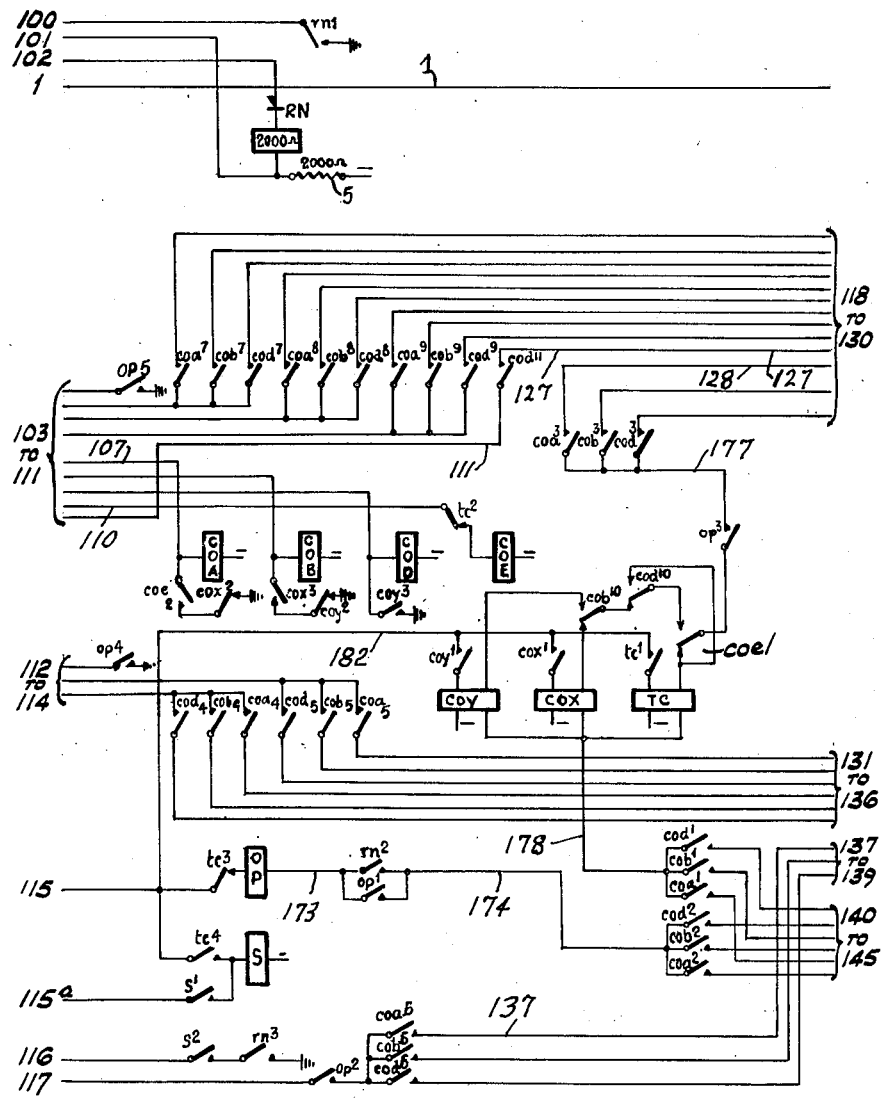
Figure 3:
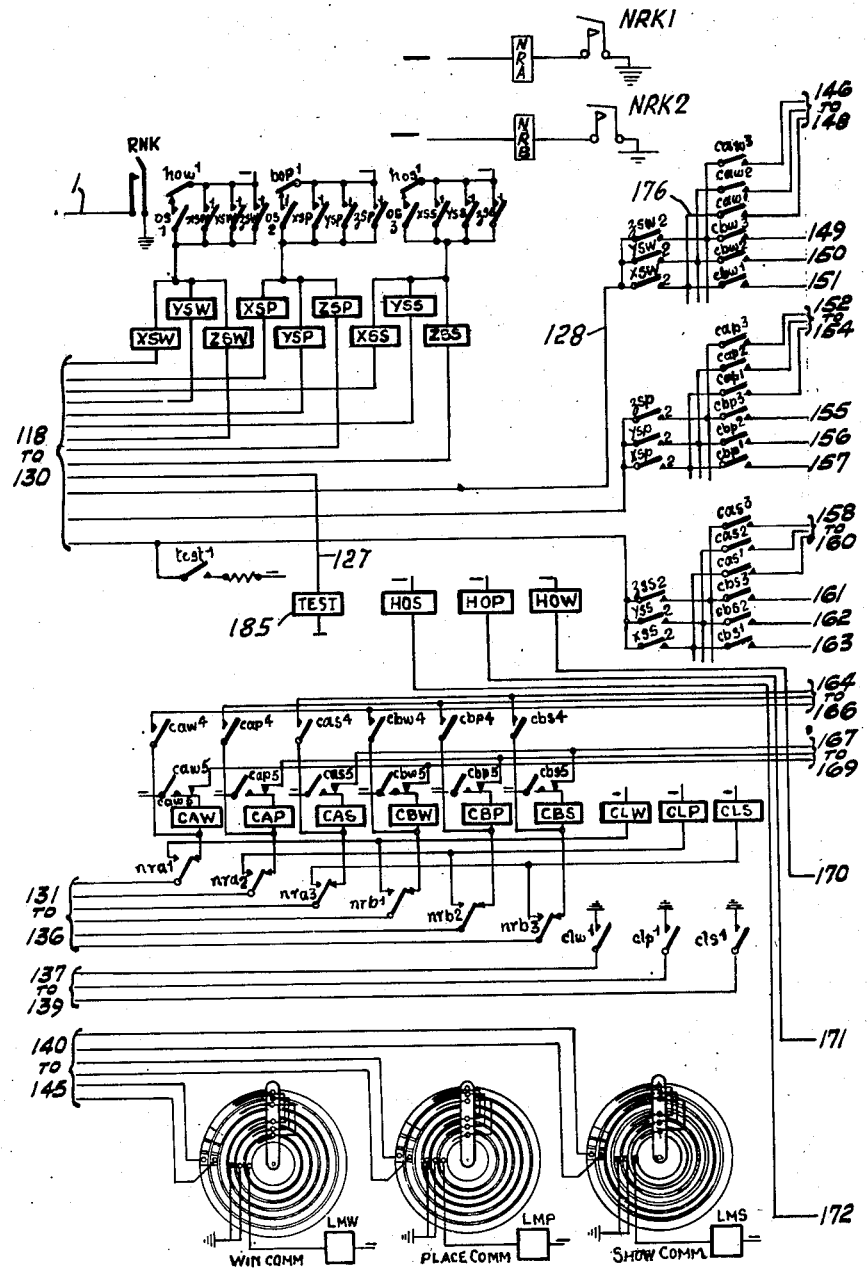
Figure 4:
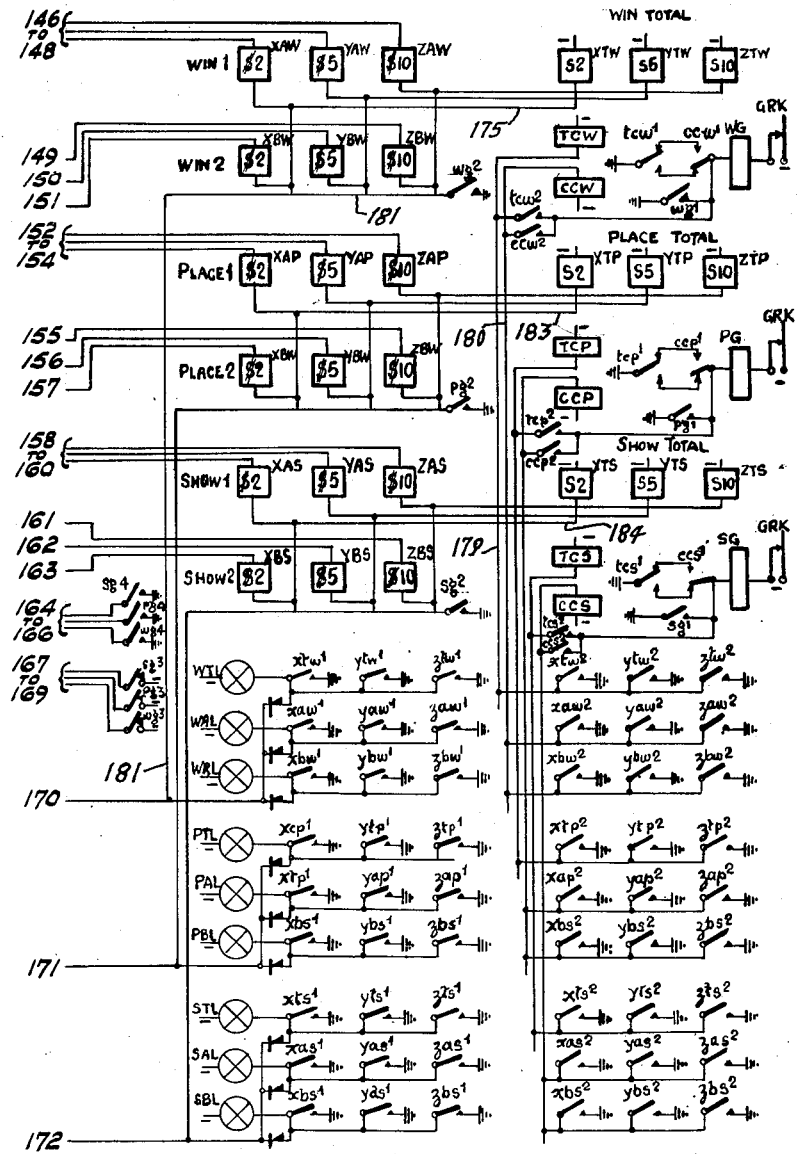

In the drawings, Figs. 1 and 2 show the electrical circuit of a ticket issuing machine or TIM of the type described in U. S. application No. 136,694, now Patent No. 2,601,949, to illustrate the invention. Figs. 3 and 4 show the central equipment for three pools, and commutators for temporarily associating any one TIM to the central equipment for a given pool. When the four sheets of drawings comprising Figs. 1 to 4, respectively, are placed side-by-side in order and in a row, they form a continuous diagram in which the groups of contact leads extending from one sheet to the other are numbered on both sheets so that the various circuits are readily traced. In the drawings the various relays or relay magnets are identified by a series of capital letters, while the switches or contacts operated by these relays are designated by corresponding small letters and a number, as for example, relay COA operates switches or contacts $coe^1$, $coa^2$, etc. The public indicators are not shown as they form no part of the present invention.

Fig. 1 shows a two-row key board, the top row of which is used for stake and pool selection while the bottom row is used for runner selection. Fig. 1 also shows a solenoid 200 used for operating the ticket printing and issuing mechanism, not shown, mechanically controlled electrical contacts, KL, L1, L2, a cancel magnet 201, a manual switch 2 for setting the race-number printing mechanism, a printing paper roll detector 3, 4 and a supervisory lamp WL.

Fig. 2 shows a relay RN for checking the correct setting of the race number switch 2, Fig. 1, relays COA . . . COE which select the type of pool in which a bet is being made, COA for win, COB for place, COD for show, COE for combined win, place and show bets: relay TC which is arranged to operate in a bet registration circuit in series with adding machine magnets or relays such as XAW, XTW in the central equipment (Fig. 4) and to cause the operation of the relay S and of the ticket issuing solenoid 200 regardless of whether the adding machine relays have in fact operated: transfer relays COX, COY which act in turn in place of relay TC in the registration of the first two bets of a combined bet in the win and place pool, the relay TC forming part of the third or show pool series registration circuit and causing the issue of the ticket regardless of whether a fault has occurred in any one of the three successive pool registrations; and relay OP which closes the series registration circuit when the latter is temporarily associated with the central equipment as described below. The issue of the ticket whether or not the bet is correctly recorded by the adding equipment does not cause any errors in odds computation because when the fault is cleared a correction is made to the readings of the adding equipment so that the bet is recorded correctly.

Fig. 3 shows: three sets of three relays XSW . . . ZSS, etc. for selecting the stake values keyed for three different pools: three relays HOW, HOP, HOS to prevent further operation when a fault occurs in a corresponding one of the three pools: a set of three relays per runner, of which two sets CAW . . . CAS, CBW . . . CBS are shown, for selecting the identity of the runner and the pool with which a bet is concerned: three cancel relays CLW . . . CLS, one per pool: and three continuously rotating commutators, one per pool, to the segments of which the various individual TIM circuits are connected and which are arranged to be slowed down or stopped, momentarily, when the wiper reaches a segment corresponding to an operated TIM, in order to allow the bet keyed on the TIM to be registered.

Fig. 4 shows sets of three operating relays or magnets for $2, $5, $10 bets respectively, one set being provided for each runner adding machine in each pool. Only two sets of operating relays e. g. XAW . . . ZAW, XBW . . . ZBW are shown for each pool, although twelve would be provided. Fig. 4 also shows the operating relays e. g. XTW . . . ZTW for the total adding machines of each pool. For each pool, check relays e. g. TCW, CCW, WG are provided for determining whether or not both an individual runner adding machine relay and a total adding machine relay operate simultaneously to register a bet.

Operation of two keys on a ticket issuing machine causes energisation of a stake relay and a competitor relay for a particular pool. These relays prepare a circuit so that the total adding machine registering relay e. g., XTW, the competitor adding machine registering relay, e. g. XAW, and the ticket issuing machine release relay TC operate in series via a commutator or a rotary collecting switch, thus ensuring that the machine will issue a ticket when the total and competitor relays or magnets on the adding machines both receive an operating potential. The machine relays or magnets have a substantial mechanical load and are liable not to operate whereas the release relay TC will always operate.

The adding machine magnets XTW, XAW, XBW, etc., carry pawls which engage escapement wheels each having fifteen teeth on the units denomination the pawls being so formed as to advance the units register two units for each operation of the magnet.

The adding machine magnets YTW, YAW, YBW, etc., if the pawls controlled thereby operate on the unit shaft, engage escapement wheels having 6 teeth each operation releases one escapement tooth so that five units are registered at each the pawls controlled by the magnets operate or if operating on a five units shaft the pawls engage escapement wheels which have thirty teeth and transfer at every second operation, one unit to the tens shaft, making a correction of five to the units shaft at each operation.

The adding machine magnets ZTW, ZAW, ZBW etc., operate on the tens denomination shaft and register $10 at each operation, and engage a thirty toothed escapement wheel. To send a $10 win bet key 8 is operated and ZSW comes up to register the bet on ZTW of the total adding machine and the Z relay of the selected competitor adding machine.

The commutators or collecting switches used are of the type described in the prior U. S. Patent No. 2,479,681, in which the wipers rotate at high speed when passing over machines which are not set up to collect a bet and are latched into a slow moving ratchet wheel to rotate at low speed when passing over a segment connected to a machine which is set up to send a bet. These collectors may be modified to arrest the wipers if desired by stopping the slow moving ratchet wheel.

When the machine is equipped to print and issue tickets for more than one pool, for instance, win, place and show, access relays COA, COB, COD are used so that the stake key, in addition to preparing a path to operate the stake relay will operate the access relay, to connect the machine to the relay apparatus, and collecting switch Fig. 3, and the adding machines Fig. 4, for that particular pool. As will be seen, separate stake keys are provided on the ticket issuing machine for each pool.

When a combined bet is to be registered on win, place and show, another relay COE operates and causes the bet to be registered on the win pool first, then the place pool and then the show pool, by successive operation of relays COA, COB, COD, before the machine is finally released to issue a ticket, engaging the three collecting switches in turn during the operation.

It is possible to register all three bets of a combined bet simultaneously by engaging all three commutators or collecting switches at one time, but this tends to delay registration from other TIMS.

The detailed operation of the equipment will now be described.

To commence betting, one of a number of race number keys RNK in the central equipment (Fig. 3) is thrown and puts an earth on a corresponding race number lead 1, connected to the corresponding contact of race number switch 2, on each TIM. Each operator then turns his switch 2 to the current race number, and when the switch is properly set, the TIM relay RN (Fig. 2) operates and puts out the warning lamp WL (Fig. 1) breaking contacts $rn^1$ connected to WL by a lead 100.

Contact $rn^2$ closes to prepare the circuit through lead 173 for the OP relay (Fig. 2).

Paper contact 3 is provided, so that, should the machine be without paper, the jockey pulley 4 will short out relay RN through a lead 101 and resistance 5 and render the machine inoperable by restoring the relay RN which breaks the circuit to the operating relay OP and lights the warning lamp WL.

An open sales key (not shown) is operated at the central equipment to energize an open sales relay (not shown) and this closes contacts $os^1$, $os^2$, and $os^3$, Fig 3, to feed potential to the adjacent stake relays XSW to ZSS.

To send a $2 win bet on competitior 1, stake key 6 and competitor key 18 are operated, and these mechanically close contacts KL as described in U. S. application No. 136,694, issued as Patent No. 2,601,949 and electrically operate relay COA via key 6 and lead 107, and prepare circuits (i) from contact $op^5$ to relay XSW via 103, key 6, lead 104 and contact $coa^7$, via lead 118 (ii) from contacts $op^4$ to relay CAW, via lead 112, key 18, lead 113, contact $coa^5$ operated, lead 131, $nra^1$ back, winding or CAW, $caw^5$ back, lead 169 and $wg^3$ back; and (iii) to the win commutator via leads 144 and 145 and front contacts $coa^1$ and $coa^2$ operated. The keys are mechanically locked in operated position.

When the win commutator wipers arrive at the segment to which the operated ticket machine is wired, a circuit is established from battery via the win latching magnet LMW, Fig. 3, the inner wipers of the two interconnected sets of three wipers each, lead 145 contacts $coa^2$ operated, lead 174, contacts $rn^2$ operated, lead 173 OP relay winding, relay back contacts $tc^3$, lead 115 and mechanical contacts L1 and KL to earth in the ticket issuing machine. LMW operates and latches the wiper arm to the slow moving ratchet wheel; relay OP operates, energising stake relay XSW from $op^5$ via lead 103, key 6, lead 104, front contacts $coa^7$, lead 118, XSW, $os^1$ front, $how^1$ back, and energizing competitor relay CAW from $op^4$, via lead 112, key 18, lead 113, $coa^5$ front, lead 131, $nra^1$ back, CAW winding, $caw^5$ back, lead 169 and $wg^3$ back.

A circuit is now provided from battery via the $2 win total adding machine counting magnet XTW, Fig. 4, lead 175, the $2 win competitor No. 1 adding machine counting magnet XAW, lead 148, competitor relay front contacts $caw^1$, lead 176, stake relay contacts $xsw^2$, lead 128, pool relay front contacts $coa^3$, $op^3$ front, connected by lead 177, contact $coe^1$ back, TC relay winding, lead 178, $coa^1$ front, lead 144 and the outer wipers of the win commutator to earth, so that XTW, XAW and TC operate to register the bet and release the ticket issuing machine. Contacts $xtw^2$ (Fig. 4) operate relay TCW via lead 179 changing over contacts $tcw^1$, and contacts $xaw^2$ operate relay CCW via lead 180 changing over contacts $ccw^1$ so that WG remains unoperated.

Each adding machine registering relay is provided with two "make" contacts as shown in Fig. 4. One of these two contacts, e. g. $xtw^1$ closes as soon as the armature of XTW commences to operate and remains closed until the armature has fully restored, to check full restoration of the armature each time a bet is registered. The other of the contacts e. g. $xtw^2$ closes only when the armature has fully operated, to check full operation of the armature. It is immaterial when the second contact reopens.

This is particularly important in adding machines of the type described in U. S. application No. 723,532, issued as Patent No. 2,575,872, in which the registering means are driven by slip clutch drives, which are controlled by escapements and pawls, which are in turn controlled by the armature of the registering relays.

This sequence of relay contact operations is obtained by having different gaps for the two contacts. The first contact e. g., $xtw^1$, Fig. 4, has a very small gap of the order of 15 mils, while the second contact, e. g. $xtw^2$ has a larger gap of the order of 50 mils. This is indicated by the angle of repose of the said contacts on the drawing.

The "make" contacts e. g., $xtw^1$ which close as soon as the armature of any registering relay in a pool begins to move, energise "hold off" relays HOW, HOP, HOS, respectively, via 170, 171 and 172, which takes potential off the stake relays XSW ... ZSS at $how^1$, $hop^1$ and $hos^1$, respectively thereabove, by leads, which for simplicity are not shown. The stake relays XSW ... ZSS are each provided with a holding contact e. g., $xsw^1$ for XSW, so that once operated they will hold independent of the corresponding "hold off" relay, but when they have been released by acceptance of the bet and consequent release of relays OP and COA as described below, they cannot operate again until the registering relay armatures have fully restored and released the "hold off" relay e. g., HOW. A signal lamp e. g., WTL (Fig. 4) on each operated adding machine will light to identify the adding machine or machines on which the "hold off" contact e. g. $xtw^1$ is making. A rectifier on each lamp circuit is used to isolate one lamp from another.

The contacts e. g. $xtw^2$ which "make" when the armature has fully operated on the total adding machine of a pool, operate total check relays TCW, TCP or TCS, respectively, and the contacts e. g. $xaw^2$ which "make" when an armature has fully operated on any competitor adding of a pool machine (these being commoned) operates competitor check relays CCW, CCP or CCS respectively.

Circuits are provided via the contacts e. g., $tcw^1$, $ccw^1$ of the two check relays, such as TCW, CCW for a pool, so that, if either one operates without the other, a circuit will be established to operate a guard relay, e. g., WG which holds up the relay HOW at $wg^2$ connected to lead 170 by a lead 181, and any competitor relay e. g., CAW which is operated at $caw^5$, via CAW winding, contact $caw^4$, lead 166 and contact $wg^4$. No further bets can now be accepted because contacts $how^1$, $how^3$ etc., open the operating circuits of the stake and competitor relays. The faulty adding machine is located by the operated competitor relay which will light a lamp (not shown). The stake can be indicated by having three pairs of relays TCW, CCW separately operated from corresponding pairs of contacts such as $xtw^3$, $xaw^3$. These relays would be locked as shown and would light lamps not shown.

Should either TCW or CCW fail to operate, WG will operate and lock up to its own $wg^1$ contacts until released by key GRK. Earth via $wg^1$ front, $tcw^2$ or $ccw^2$ contacts connected respectively to leads 179 and 180 also locks TCW or CCW which ever is operated, to indicate whether total relay XTW or competitor relay XAW has failed to operate.

Meanwhile, contacts $wg^2$ will hold up the HOW relay which has been operated by contacts $xtw^1$, or $xaw^1$. Relay HOW opens the operating circuits of the stake relays at $how^1$, and relay WG opens the operating circuits to competitor relays at $wg^3$.

Relay CAW is held to indicate the faulty adding machine over contacts $caw^4$ front, lead 166 and $wg^4$ front until WG is released by operation of key GRK. The circuits for the stake relays XSW, YSW, ZSW, are opened at contacts $how^1$ but relays XSW will remain operated, via $xsw^1$, until relay OP in the ticket machine has restored and opened contacts $op^5$.

Relay TC operates and locks up over $tc^1$ front, lead 192 and 115 and mechanical contacts L1 and K1 of the TIM, and closes contacts $tc^4$ to operate S which energizes the solenoid over contacts $s^2$, $rn^3$ in lead 116 to print and issue a ticket. Relay S locks up over contacts L2 and $s^1$ in lead 115a.

As the solenoid 200 commences to operate, contacts L1 open releasing relay TC but keeping open the circuit of relay OP. When the solenoid has fully operated, contacts L2 open to release the machine to issue the ticket. The operated keys 6, 18 are released and contacts KL are opened as the ticket is issued. Contacts L1 close as the solenoid fully restores. The release of the keys releases relay COA, and the circuits restore to normal.

To send a $5 bet in the win pool on competitor No. 2, keys 7 and 19 are depressed, operating relays COA, YSW and CBW which cause the bet to be registered by total adding machine relay YTW and competitor adding machine relay YBW to register a $5 bet.

To send a place bet of $2, $5 or $10 stake key 9, 10 or 11 are depressed and these bring up relay COB which connect the ticket machine to the place stake and competitor relays, commutator and adding machines, which operate in the same manner as for win bets.

To send a show bet on these values $2, $5 or $10 stake keys 12, 13 or 14 are depressed and any of these keys bring up COD relay which connects the machine to the show equipment and operates as for win or place.

To send a combined bet of $2, that is win, place and show, on, say, competitor 1, stake key 15 and competitor key 18 are operated.

Key 15 brings up relay COE over lead 110 and back contacts $tc^2$, which changes over contact $coe^1$ in the circuit of relay TC and operates relay COA over $coe^2$ front, $cox^2$ back.

With COA operated a $2 bet is sent as before except that after the first transfer relay COX is energised in series with XTW and XAW and the win commutator wipers.

As the $2 win bet is registered, COX operates and releases COA at $cox^2$ and operates COB via $cox^3$ front, $coy^2$ back. This releases the win commutator so that relays XTW and XAW restore. Relay OP also releases unless the place commutator happened to be on the segment belonging to the operated TIM in which case magnet LMP will operate via lead 143, $cob^2$ front in series via leads 174 and 173 with relay OP which will hold.

Relay CAW is released and relay CAP is energising to record competitor No. 1 in the place pool. Relay CAW is released by the opening of contacts $coa^5$. Relay CAP energises via lead 132, contacts $cob^5$ front, lead 113 and key 18 connected by lead 112 to contacts $op^4$. Otherwise, when the place commutator reaches the marked segment, magnet LMP energises in series with relay OP which operates and connects earth via $op^5$ front and lead 193 to key 15, which is now connected via lead 104, contacts $cob^7$ front and lead 119 to operate relay XSP. A registration circuit is now completed via the place total adding machine relay XTP, lead 183, No. 1 place adding machine XAP, lead 154, front contacts $cap^1$, $xsp^2$, lead 129, $cob^3$ lead 177, $op^3$, $coe^1$ back contact, $cod^{10}$, $cob^{10}$ front winding of the first transfer relay COX, lead 178, $cob^1$ front, lead 142 and the place commutator to earth.

The two adding machine relays operate to register the bet and the second transfer relay COY operates, releasing COB at $coy^2$ and operating COD via $coy^3$.

OP, XTP and XAP restore and the place commutator is released.

COD operates and changes over contacts $cod^{10}$, so that the circuit via $op^3$ is now connected via $coe^1$ and $cod^{10}$ to relay TC instead of relay COY. When the show commutator reaches the marked segment, OP comes up again and battery now feeds show total adding machine relay XTS, No. 1 show adding machine relay XAS by lead 134 and TC relay in series, via lead 160 and its connections, and the show commutator to earth.

Operation of TC releases relay OP, the commutator, and the adding machine relays and energises relay S to print and issue the ticket.

It will be seen that if a fault occurs in the registration of the win portion of a combined bet, relay WG will operate and hold relay HOW in the manner previously described. This will open the circuits of the win pool relays XSW ... ZSW, CAW, CBW ... and prevent further registration on the win adding machines until the fault is cleared. Nevertheless, operation of relay COX will operate relays COB in place of relay COA and the continued operation of relay HOW and consequently of relay CAW will have no effect on registration in the place pool and will not cause further registration in the win pool because contacts $coa^7$, 8 and 9 in the circuits of relays XSW, YSW, ZSW are open. Similarly an adding machine fault in the place pool would be indicated, but would not prevent operation of the show pool adding machines for the combined bet. A fault in the show pool would not prevent relay TC energising in the adding machine series circuit and operating in turn relay S and the TIM solenoid. Thus, because the signalling between the TIM and the central equipment is always from the TIM to the central adding machine equipment by the closure of the TIM relay contacts $op^3$, the TIM operations are never interfered with by a fault, or even by faults in all three pools on a combined bet. In every case the ticket is issued regardless of the fact that the adding machine equipment of a pool has operated incorrectly and has been out of service until the fault is cleared. All necessary particulars for allowing a maintenance man to correct a faulty registration are indicated until the fault is cleared so that the issue of a ticket when an adding machine fault occurs does not result in faulty records.

To prevent tickets being issued on non-runners, relays NRA, NRB etc. are provided (Fig. 3) and are operated by manual keys. NRK1, NRK2, etc. These relays change over contacts $nra^1$, $nra^2$, $nra^3$, $nrb^1$, $nrb^2$, $nrb^3$ etc. (Fig. 3), in leads 131 to 136 respectively so that when the OP relay comes up to prepare a betting circuit on a non-runner, the impulse is diverted from the competitor recording relay to one of the cancel relays CLW, CLP, CLS, Fig. 3, which operates the cancel magnet 201 in the machine, Fig. 1, which restores the operated keys to normal.

A test key 17 is provided on the machines to issue a test ticket, and this brings up the COD relay via lead 109 to operate the machine over the show commutator (this being the least busy unit). A test relay 185, Fig. 3 is operated via lead 127, contacts $cod^{11}$ front, lead 111, test key 17, lead 163 and, $op^5$ front, which at front contacts $test^1$ (Fig. 3) connect battery via a resistance whose value is equal to the combined resistance of the total and competitor adding machine relays in series, to the lead 130 in the circuit of relay TC in place of such machine relays, so that relay TC energizes and causes the issue of a test ticket.

What is claimed is:

1. In a totalisator in which bets of various values on all competitors and on various pools may be registered from any one of a number of ticket issuing machines, a plurality of competitor adding machines and a total adding machine for each pool, a plurality of registering relays for each said adding machine, a collecting switch for each pool over which any ticket issuing machine may be connected to the adding machines for that pool, means provided to register a bet of any selected value and on any selected competitor on the appropriate adding machines of said pool in turn by operating a combined pool control relay and a competitor relay in response to the operation of a combined pool and stake key and a competitor key on the ticket issuing machine to select and operate in series the selected one of said registering relays on the total adding machine of a first one of said pools, the selected one of said registering relays of the selected competitor adding machine of said first pool and a first transfer relay associated with the ticket issuing machine and via the collecting switch of the first pool, and then to select and operate in series under control of said first transfer relay the selected one of said registering relays on the total adding machine of a second one of said pools, the selected one of said registering relays of the selected competitor adding machine of the second pool and a second transfer relay associated with the ticket issuing machine and via the collecting switch of the second pool, and then to select and operate in series under control of said second transfer relay the selected one of said registering relays of the total adding machine of a third one of said pools, the selected one of said registering relays of the selected competitor adding machine of the third pool and a ticket release relay associated with the ticket issuing machine and via the collecting switch of the third pool.

2. Electrical totalisator equipment comprising ticket issuing machines and central totalising equipment, keys for different competitors and for different stake values on each ticket issuing machine, electrically operable ticket issuing mechanism in each ticket issuing machine, a pool total adding machine in the central equipment, a plurality of bet registering relays for stake values associated with said total adding machine, a group of competitor adding machines in said central equipment, a plurality of competitor bet registering relays associated with each competitor adding machine, electrical stake selecting equipment which forms part of the central equipment, electrical competitor selecting equipment which forms part of the central equipment, a ticket release relay individual to each ticket issuing machine for operating said electrically operable ticket issuing mechanism, a commutator in the central equipment arranged to select an operated ticket issuing machine for registration purposes and a plurality of adding machine operating circuits each comprising said total bet registering relays, one of said competitor bet registering relays, contacts controlled by said commutator, contacts controlled by said stake registering equipment, contacts controlled by said competitor registering equipment, and a ticket release relay, said circuits being arranged so that a selected competitor adding machine, a pool total adding machine and said release relay are simultaneously operable to register at the central equipment a bet set-up at a ticket issuing machine and to issue a ticket for said bet.

3. In an electrical totalisator system, a ticket-issuing machine comprising at least one combined pool key and competitor keys, central totalisator equipment comprising total adding equipment and competitor adding equipment for each pool, means for automatically selecting and operating adding equipment of a particular pool, means associated with the adding equipment of each pool for checking the registration of bets in that pool, fault detection means under control of said bet registration checking means and arranged to operate if said checking means detects an incorrectly registered bet, means for indicating the particulars of an incorrectly registered bet under control of said fault detection means, means under control of said fault detection means for rendering the adding equipment of a pool inoperative when a fault is detected, automatic sequence control equipment for causing the individual bets of a combined bet to be automatically registered in turn on the adding equipment of the different pools independently of the operation of fault detection means in any pool, electrically operable ticket issuing mechanism in each ticket issuing machine operable to issue a ticket for a bet independently of said fault detection means.

4. Electrical totalisator equipment as claimed in claim 3, comprising electrical adding equipment operating circuits for a first pool comprising ticket issue operating means for a ticket issuing machine, electrical adding equipment operating circuits for said first pool comprising sequence control means, electrical adding equipment operating circuits for a second pool comprising ticket issue operating means for a ticket issuing machine, electrical switching means operable under control of a combined bet key for completing an adding equipment operating circuit for said first pool comprising sequence control means, and contacts of said sequence control means for causing disconnection of said first pool adding circuit and completion of an adding equipment operating circuit for said second pool, whereby said ticket-issue operating means operates to issue a ticket.

5. Electrical totalisator equipment as claimed in claim 4, comprising a single sequence control relay forming said sequence control means and individual to said combined pool ticket issuing machine and a single ticket issue control relay individual to said combined pool ticket issuing machine.

6. In a totalisator adding equipment, means for registering the stake for a bet, means for registering the identity of the competitor on which the bet is made, means under control of said stake registering means and said competitor registering means for operating the adding equipment, means associated with said adding equipment for checking the registration of a bet, means under control of said checking means for releasing said stake registering and said competitor registering means when the bet has been correctly recorded by said adding equipment, further means under control of said checking means and arranged to automatically detect a fault in the recording of a bet by said adding equipment, means under control of said fault detection means for indicating that a fault has occurred, means under control of said fault detection means for rendering the registering equipment inoperable when a fault has been detected and means also under control of said fault detection means for maintaining operated that part of the stake and competitor registering means on which the bet in question is registered when a fault has occurred, whereby the portion of the adding equipment which is faulty is indicated by the combination of operated registering means.

7. In a totalisator adding equipment as claimed in claim 6, total adding equipment and competitor adding equipment, circuits for operating the total adding equipment in series with each competitor adding equipment separately, means for operating means for indicating a fault on the total adding equipment and means for operating means for indicating a fault on a competitor adding equipment.

8. In a totalisator adding equipment for each of a plurality of pools, means individual to each pool for registering the stake for a bet, means individual to each pool for registering the competitor for a bet, means under control of said stake and competitor registering means for a pool for operating the adding equipment of that pool, means associated with the adding equipment of each said pool for checking the registration of bets in that pool, means responsive to an indication by the checking means associated with the adding equipment of that pool that a bet has been correctly recorded to release said registering means, further means under control of said checking means for automatically detecting a fault in the recording of a bet by said adding equipment, means under control of said fault detection means for indicating that a fault has occurred, means under control of said fault detection means for rendering the registering equipment inoperable when a fault has been detected, and means also under control of said fault detection means for maintaining operated that part of the stake and competitor registering means on which the bet in question is registered when a fault has occurred, whereby the portion of the adding machine which is faulty is indicated by the combination of operated registering means.

9. In a totalisator adding equipment as claimed in claim 8, total adding equipment for each pool, competitor adding equipment for each pool, circuits for operating the total adding equipment of each pool in separate series circuits with each competitor adding equipment of the same pool, means for operating means for indicating a fault on the total adding equipment of each pool, and means for operating means for indicating a fault on a competitor adding equipment of each pool.

10. Electrical totalisator equipment as claimed in claim 2, comprising keys for different pools on each ticket issuing machine, a plurality of pool total adding machines, one per pool, a plurality of groups of competitor adding machines, one group per pool, electrical pool switching devices individual to each ticket issuing machine, a plurality of adding machine operating circuits per pool, and contacts of said electrical pool switching devices controlling said adding machine operating circuits.

11. Electrical totalisator equipment as claimed in claim 10, comprising combined pool keys on each ticket issuing machine and automatic electrical transfer devices operable in response to operation of a combined pool key to complete automatically in turn adding machine operating circuits in each of a plurality of pools, each said electrical transfer device operating in one of said adding machine operating circuits and completing the adding machine circuit of the next pool.

12. Electrical totalisator equipment as claimed in claim 11 comprising further adding machine operating circuits each comprising a transfer relay in place of said ticket release relay, said transfer relay or relays forming part of said automatic electrical transfer devices, and transfer circuits controlled by said transfer relays, each said transfer relay operating in one of said adding machine operating circuits and completing the adding machine circuit of the next pool, whereby said pool switching devices are operable to complete in turn adding machine operating circuits in a plurality of pools.

13. Electrical totalisator equipment as claimed in claim 12 comprising fault detection means associated with the adding machines of each pool, means for rendering the adding machine of a pool inoperative when a fault in the registration of a bet occurs, means for temporarily operating means for indicating particulars of a fault, said means operating independently of said combined pool transfer relays whereby adding operations for a plurality of pools in turn continue regardless of the occurrence of a fault in any one or more pools.

14. Electrical totalisator equipment as claimed in claim 13 and comprising contacts of said transfer relays for connecting up in turn an adding machine operating circuit for the first pool comprising a transfer relay and an adding machine operating circuit for said second pool.

References Cited in the file of this patent

UNITED STATES PATENTS

| Number | Name | Date |
|---|---|---|
| 1,056,866 | Webster | Mar. 25, 1913 |
| 2,290,489 | Nelsen et al. | July 21, 1942 |
| 2,456,112 | Dodd | Dec. 14, 1948 |
| 2,479,681 | Handley | Aug. 23, 1949 |
| 2,534,602 | Julius | Dec. 19, 1950 |

FOREIGN PATENTS

| Number | Country | Date |
|---|---|---|
| 377,319 | Great Britain | July 28, 1932 |
| 510,441 | Great Britain | July 31, 1939 |
| 572,103 | Great Britain | Sept. 24, 1945 |